US007285226B2

(12) United States Patent
Bengali

(10) Patent No.: US 7,285,226 B2
(45) Date of Patent: Oct. 23, 2007

(54) METHOD FOR FABRICATING A FLUID EJECTION DEVICE

(75) Inventor: Sadiq Bengali, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 99 days.

(21) Appl. No.: 10/976,580

(22) Filed: Oct. 29, 2004

(65) Prior Publication Data

US 2006/0016780 A1 Jan. 26, 2006

Related U.S. Application Data

(60) Provisional application No. 60/590,412, filed on Jul. 22, 2004.

(51) Int. Cl.
*G11B 5/127* (2006.01)

(52) U.S. Cl. ........................... 216/27; 216/27; 216/58; 216/41; 216/42; 216/67; 216/88; 438/21; 438/626; 438/706; 438/712; 438/780; 347/65; 347/66; 347/50; 347/94; 347/100; 347/102

(58) Field of Classification Search .................. 216/38, 216/41; 347/20; 438/21, 626, 706
See application file for complete search history.

(56) References Cited

U.S. PATENT DOCUMENTS

| | | | | |
|---|---|---|---|---|
| 6,472,332 | B1 * | 10/2002 | Gooray et al. | 438/745 |
| 6,718,632 | B2 * | 4/2004 | Liu et al. | 29/890.1 |
| 2003/0063163 | A1 * | 4/2003 | Seaver et al. | 347/67 |

OTHER PUBLICATIONS

S. Wolf, Silicon Processing for the VLSI Era, vol. 1 Lattice Press (1986) pp. 541 and 544.*

S.Fuller, Jounral of Microelectromechanical Systems, vol. 11, No. 1, p. 54-60, (2002).*

* cited by examiner

*Primary Examiner*—Nadine Norton
*Assistant Examiner*—Maki Angadi

(57) ABSTRACT

A method of fabricating a fluid ejection device comprises providing a barrier layer which defines fluidic spaces. The fluidic spaces defined by the barrier layer are filled with filler. A throughway is etched through the substrate. The filler is removed from the fluidic spaces after etching the throughway.

36 Claims, 9 Drawing Sheets

METHOD FOR FABRICATING A FLUID EJECTION DEVICE

CROSS-REFERENCE TO RELATED APPLICATIONS

This application claims the benefit of U.S. Provisional Application No. 60/590,412, filed on Jul. 22, 2004.

BACKGROUND

Some fluid ejection devices, such as ink jet printheads, are fabricated using a sacrificial material that is later removed. The fluid ejection circuitry is fabricated on a die using thin film techniques. A barrier layer is disposed over the thin film stack. Fluidic structures defined within the barrier layer are filled with a sacrificial filler material Which is later removed through orifices in an orifice layer disposed over the barrier layer. The ability to remove sacrificial material through the orifices in a given time and at a given cost is limited by the size of the nozzle and width of the fluidics. At the same time, it is desired by designers of ink jet printheads to decrease nozzle size to increase resolution. However, the ability to fabricate smaller orifices is limited by the ability to remove the sacrificial material through the orifices during device fabrication.

BRIEF DESCRIPTION OF THE DRAWINGS

Features of the invention will readily be appreciated by persons skilled in the art from the following detailed description of exemplary embodiments thereof, as illustrated in the accompanying drawings, in which.

DETAILED DESCRIPTION OF THE DRAWINGS

Figure 1:
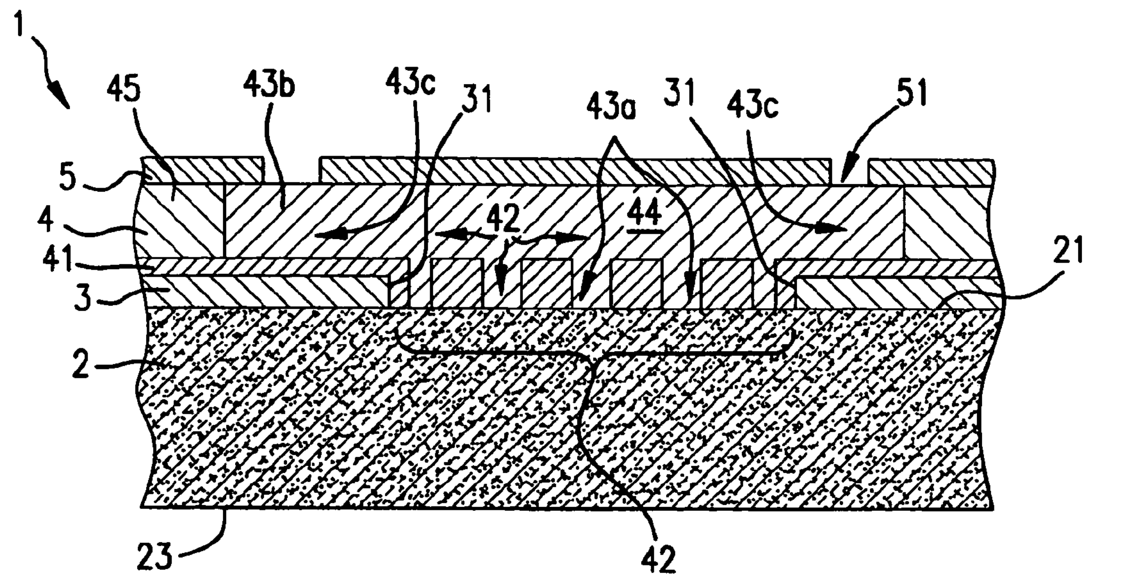
FIG. 1 is a cross-sectional view of an exemplary embodiment of a partially completed fluid ejection device with filler in fluidic structures defined in a barrier layer.

In the following detailed description and in the several figures of the drawing, like elements are identified with like reference numerals.

FIG. 1 illustrates an exemplary embodiment of a fluid ejection device 1 at an unfinished stage of fabrication. The fluid ejection device 1 is fabricated on a substrate 2, for example a silicon die. A thin film stack 3 has been fabricated on the top surface 21 of the substrate 2. In an exemplary embodiment, the thin film stack 3 comprises, for example, heater elements, e.g. resistors, transistors, logic functions and electrical connections. A barrier layer 4 is disposed over the thin film stack 3. In an exemplary embodiment, a photo-resistive primer layer 41 is disposed on the substrate 2 and over the thin film stack 3 prior to disposing the barrier layer 4. In an exemplary embodiment, the primer layer comprises a layer of SU8 about 4 um thick. In an exemplary embodiment, the primer layer is cured for about 30 minutes at 170 degrees Celsius before disposing the barrier layer 4 over the primer layer. Edges 31 of the thin film stack 3 define a fluid feed hole 42 which is not covered by the thin film stack 3.

In an exemplary embodiment, the barrier layer 4 comprises photoresistive material 45, for example SU8. In an exemplary embodiment, the barrier layer 4 can be between about 8 um to 30 um thick, in exemplary embodiments. The barrier layer defines interior fluidic spaces 43 which correspond to interior voids and cavities through which fluid can pass in a fluid ejection device in a later or finished stage of fabrication. In an exemplary embodiment, the fluidic spaces 43 are defined, in part, in the primer layer, as shown in FIG. 1.

In the exemplary unfinished device stage of FIG. 1, the fluidic spaces 43 are filled with a filler 44. The filler 44 comprises a sacrificial material which occupies the fluidic spaces 43 through which, when the sacrificial material has been removed, fluid may pass. In an exemplary embodiment, the filler 44 comprises a photo-resist, for example SPR220, which is available from the Shipley Company. In an exemplary embodiment, the fluidic spaces comprise a void or voids 43*a* in the primer layer 41, a firing chamber 43*b* and fluid channels 43*c*. In an exemplary embodiment, the voids 43*a* are sized and spaced to permit fluid to pass from a throughway 24 in the substrate 2 (FIG. 6), through the primer layer 41 and into the fluidic spaces 43 in the barrier layer 4 and to prevent particles in the fluid from passing through the primer layer 41. The voids 43*a* can be sized, in one exemplary embodiment, at about 50% to 70% of the size of the diameter of the orifices 51. In an exemplary embodiment, the firing chambers 43*b* are as small as 9 um wide. In an exemplary embodiment, the fluid channels 43*c* are as long as 60 um and less than 10 um wide, for example 6 um wide.

In the exemplary embodiment shown in FIG. 1, the plurality of voids 43*a* were defined in the photo-resistive primer layer 41 by selective exposure through a mask to radiation, which may be, for example, 365 nm I-line radiation obtained by filtering light from a mercury arc lamp. In an exemplary embodiment, the exposed primer layer 41 was developed with a solvent, for example ethyl lactate, before the barrier layer and/or the filler were disposed over the primer layer 41.

In the exemplary embodiment of FIG. 1, a "top hat" or orifice layer 5 has been disposed or defined over the barrier layer 4. In an exemplary embodiment, the orifice layer 5 is spun on top of the barrier layer 4. In other exemplary embodiments, the orifice layer 5 is defined in a surface layer of the barrier layer 4 by exposing the surface of the barrier layer to radiation to a depth defining the orifice layer 5.

In the exemplary embodiment of FIG. 1, the photo-resistive orifice layer 5 has been exposed to radiation through a mask to define orifices 51. The orifices 51 have been developed in a solvent 6, thereby removing unexposed material to create the orifices 51. In an exemplary embodiment, the solvent 6 is ethyl lactate. In an exemplary embodiment, the orifice layer 5 is developed for a period of time sufficient to create the orifices 51 without removing all of the filler from the fluidic structures. The orifice layer can be developed, for example, for a period of time sufficient to create the orifices 51 without removing any or without removing a significant amount of filler 44. In an exemplary embodiment, the orifice layer 5 is developed in the solvent 6 for a period of up to about 90 seconds. In an exemplary embodiment, the orifices 51 are less than 10 um, for example as small as at least 6 um.

Figure 5:
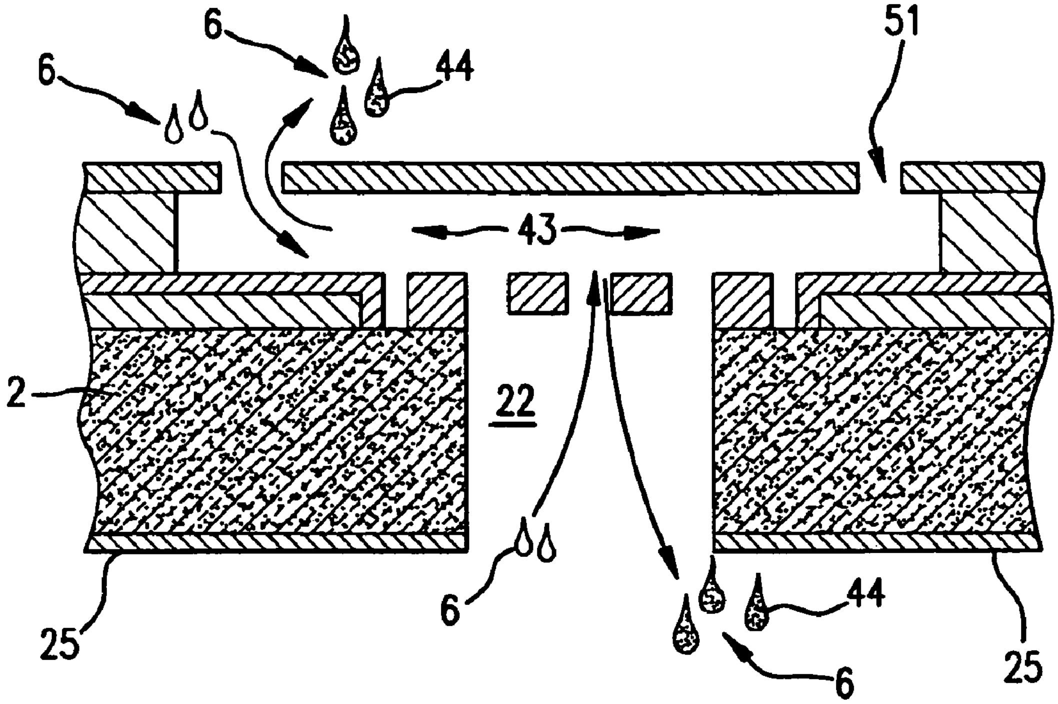
FIG. 5 is a cross-sectional view of an exemplary embodiment of a fluid ejection device without filler in the fluidic structures defined in the barrier layer.

In an alternate embodiment, the orifice layer 5 is developed after a formation of throughway 22 (FIG. 5). However, in some embodiments, formation of throughway 22 can generate temperatures in the orifice layer 5 sufficient to cause unexposed photo-resist in those portions of the orifice layer 5 in which the orifices 51 are defined to cross link. Such cross-linked material may become difficult to remove during a subsequent develop. In those embodiments, the orifice layer 5 may be developed prior to etching. In the exemplary embodiment of FIG. 1, the filler 44 is in contact with the top surface 21 of the substrate 2. In this exemplary embodiment, the filler contacts the substrate through the voids 43*a* formed in the primer layer 41.

Figure 2A:
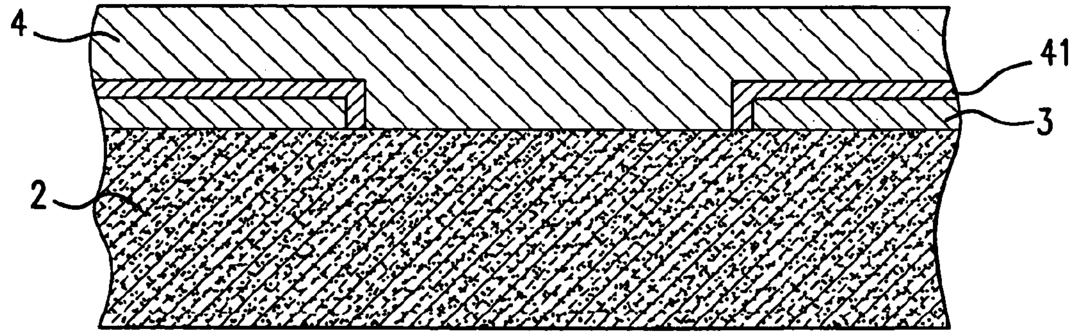
FIGS. 2A-2E illustrate an exemplary embodiment of a fluid ejection device at exemplary stages of an exemplary embodiment of a method of fabricating a fluid ejection device.
Figure 2B:
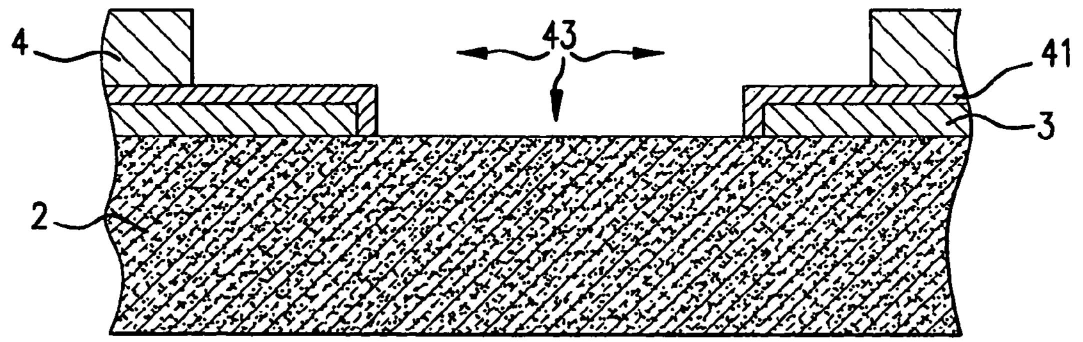
Figure 2C:
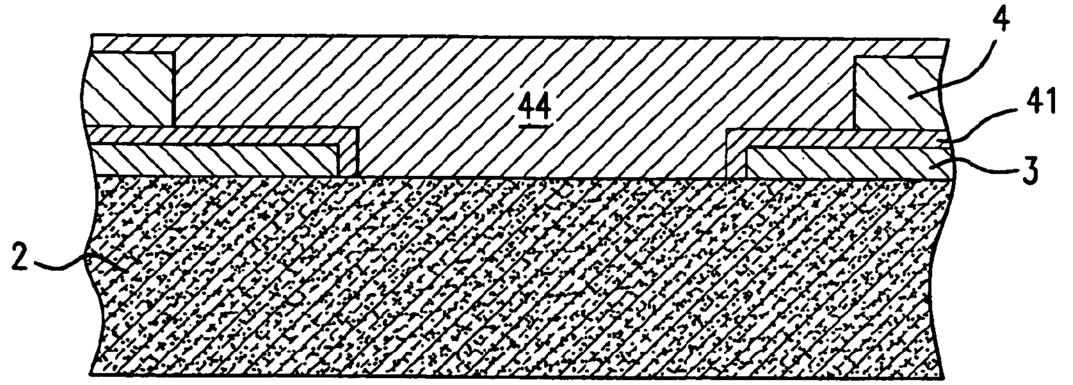
Figure 2D:
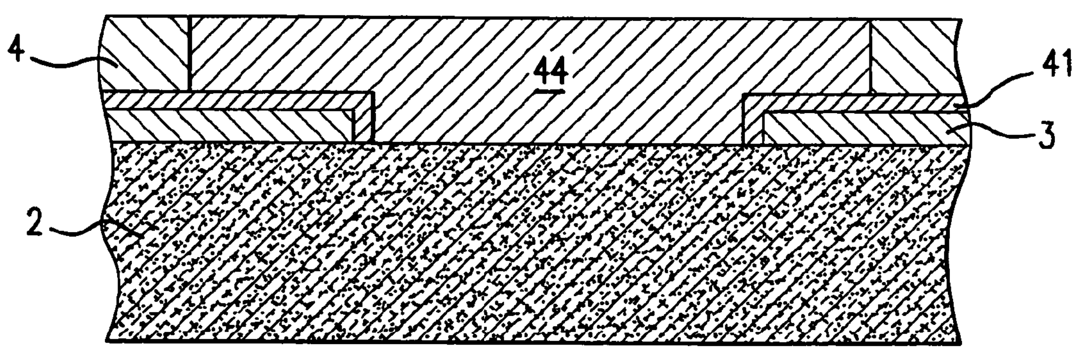
Figure 2E:
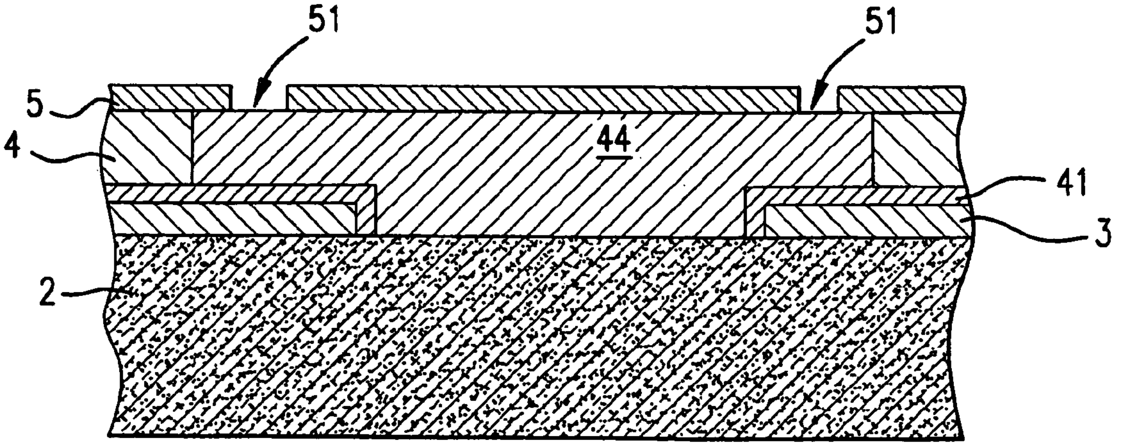

The fluidic spaces 43 and orifices 51 may be defined, for example, by the method illustrated in FIGS. 2A-2E. In FIG. 2A, the barrier layer 4 of photo-resistive material 45 has been disposed over the primer 41, thin film stack 3 and substrate 2. In FIG. 2B, the photo-resistive material has been selectively exposed through a mask and developed, leaving the barrier layer 4 with voids comprising the fluidic spaces 43. In FIG. 2C, the fluidic spaces 43 have been filled with the filler 44, for example using a coat and spin technique. In FIG. 2D, the surface of the filler 44 and barrier layer 4 have been planarized, for example using a chemical/mechanical polish technique, to remove any excess filler from the top of the barrier layer and to provide a suitable surface on which to dispose an orifice layer 5. In FIG. 2E, an orifice layer has been disposed over the barrier layer and filler, selectively exposed to define orifices and developed to create the orifices 51.

Figure 3A:
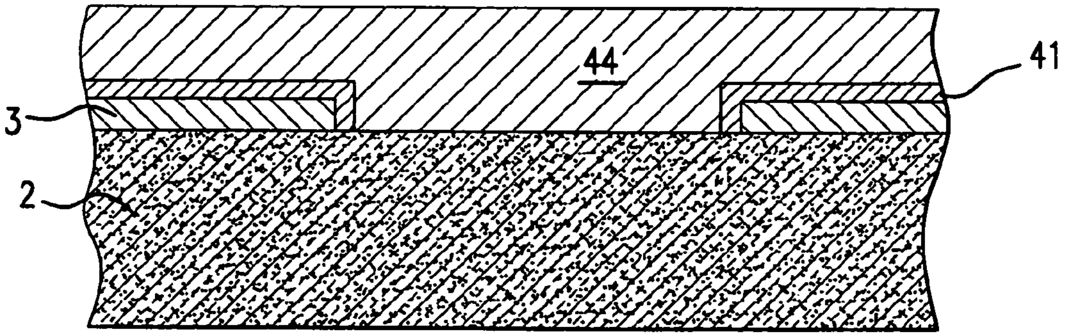
FIGS. 3A-3D illustrate an exemplary embodiment of a fluid ejection device at exemplary stages of another exemplary embodiment of a method of fabricating a fluid ejection device.
Figure 3B:
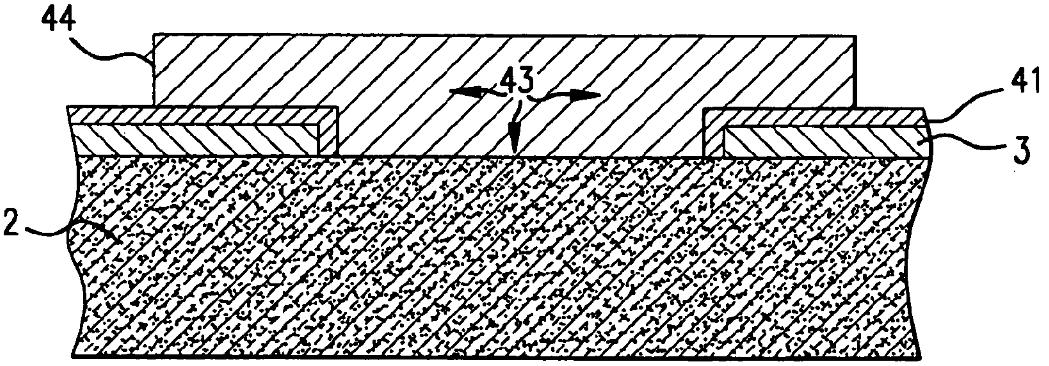
Figure 3C:
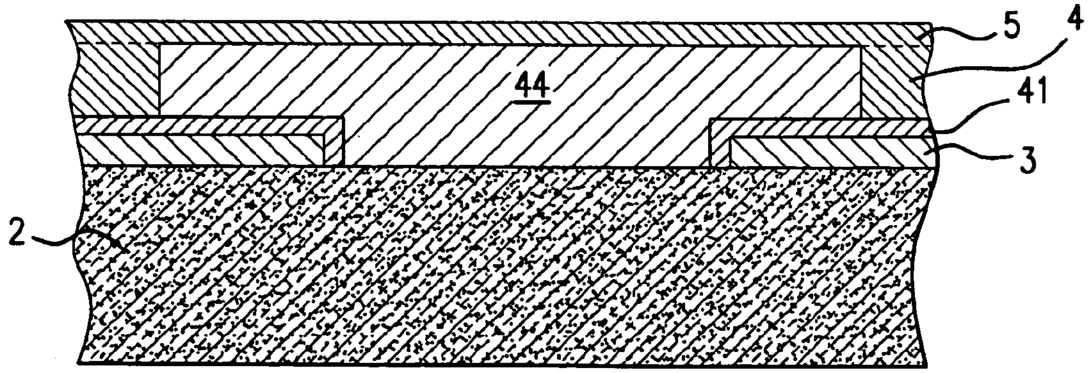
Figure 3D:
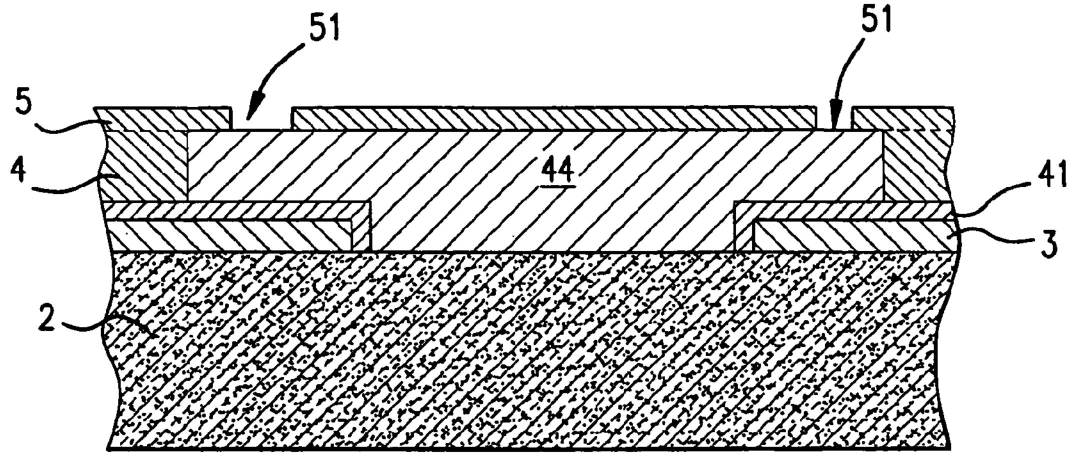
Figure 4A:
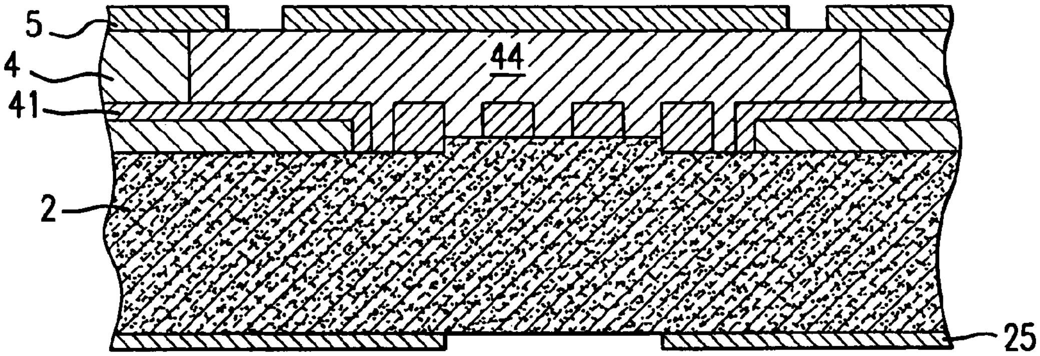
FIG. 4A is a cross-sectional view of an exemplary embodiment of a fluid ejection device with a thermal oxide layer on the backside of the substrate.
Figure 4B:
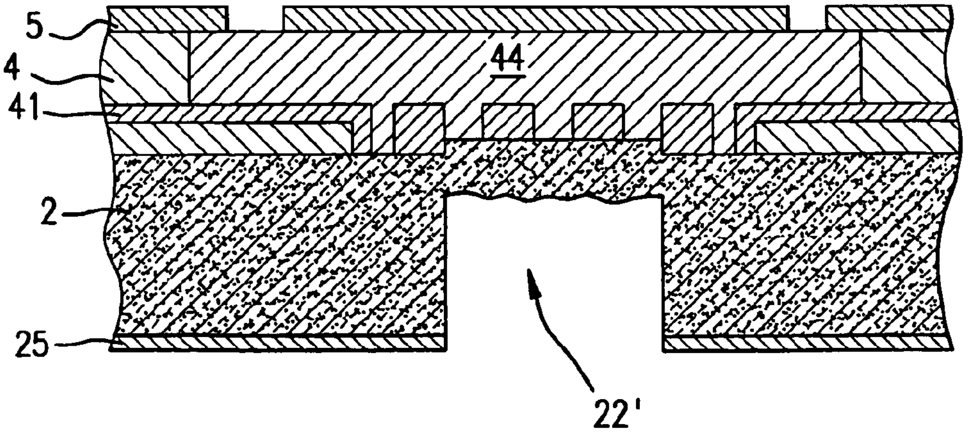
FIG. 4B is a cross-sectional view of an exemplary embodiment of a fluid ejection device with a thermal oxide mask on the backside of the substrate.
Figure 4C:
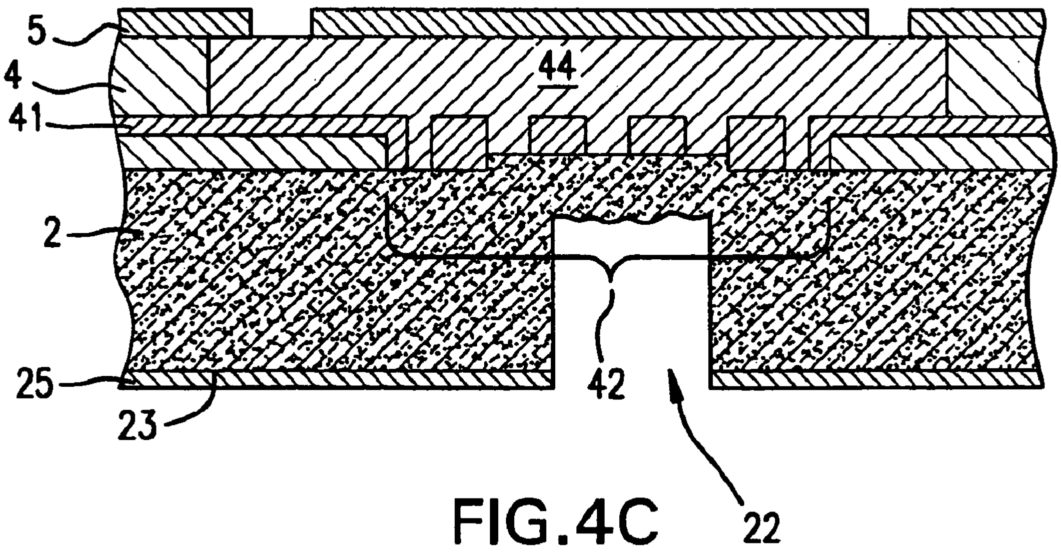
FIG. 4C is a cross-sectional view of an exemplary embodiment of a fluid ejection device with a partial throughway in the substrate.
Figure 4D:
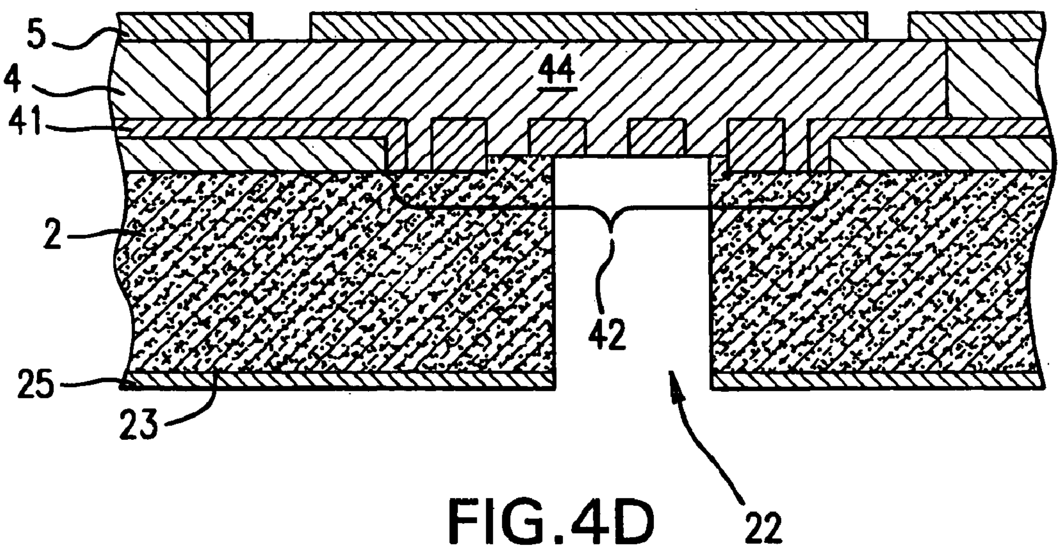
FIG. 4D is a cross-sectional view of an exemplary embodiment of a fluid ejection device with a throughway in the substrate.

In an alternate embodiment, the fluidic spaces 43 and orifices 51 may be defined, for example, by the method illustrated in FIGS. 3A-3D. In FIG. 3A, a "bump" layer of filler 44 has been disposed over the substrate 2, thin film stack 3 and primer 41. In FIG. 3B, the filler 44 has been selectively exposed and developed, leaving filler 44 in shapes which define the fluidic spaces 43. In FIG. 3C, a barrier layer 4 of photo-resistive material 45 has been disposed over and around the filler 44, defining the barrier layer 4 and orifice layer 5. In FIG. 3D, the orifice layer has been selectively exposed and developed, leaving orifices 51. The fluidic spaces 43 may be defined and filled in any other appropriate manner.

FIG. 4 illustrates the exemplary embodiment of FIG. 1 after a throughway or trench 22 has been formed in the substrate 2 by, for example, a backside etch from the backside 23 of the substrate 2. The backside etch may comprise a dry etch, for example reactive ion etching. A mask 25 may be used to define the area in which the throughway 22 is formed. In an exemplary embodiment, the mask 25 comprises a layer of photo-resist, for example a layer of SPR220. The layer of photoresist can be within a range of about 13 um to 15 um thick. The throughway 22 extends from the backside 23 of the substrate 2 to the top side 21 of the substrate. In an exemplary embodiment, the etch extends up to and/or a short distance into the primer layer 41 and/or the filler 44 without extending all of the way through the primer layer 41. In an exemplary embodiment, the throughway 22 is about 80-85 um wide, which is less than the width of the fluid fill hole 42, which may be about 130-140 um. In an exemplary embodiment, having the width of the throughway 22 be less than the width of the fluid fill hole 42 allows for subsequent lateral etching which occurs during a subsequent backside etch (FIG. 6).

In an exemplary embodiment, the throughway 22 shown in FIG. 4 is formed using a reactive ion etch. In an alternate embodiment, shown in FIGS. 4A-4D, a partial throughway 22' is first be formed using a sand drill or laser etch. The backside of the substrate may have a thermal oxide layer that may function as a mask for a subsequent wet etch. In the embodiment of FIG. 4, a laser or sand drill has etched through the thermal oxide layer to define a 500 um wide throughway opening. The etch can extent into the backside of the substrate, as shown. In the embodiment of FIG. 4C, a narrower width laser or sand drill has etched a partial throughway 22' through about 80-85% of the thickness of the substrate. In an exemplary embodiment, the width of the throughway 22' is in a range of about 70-100 um wide. The remaining 15-20% of the thickness of the substrate 2 can then be etched through by reactive ion etching to form the throughway shown in FIG. 4D. The throughway is subsequently etched using a wet etch to form an expanded throughway, in an exemplary embodiment.

FIG. 5 illustrates the exemplary embodiment of FIGS. 1 and 4 after the filler has been removed. The filler can be removed, for example, applying a solvent 6 via throughway 22. In exemplary embodiments, the solvent 6 comprises ethyl lactate, n-methyl pyrrolidone (NMP) or other suitable solvent. The solvent 6, with the dissolved filler material, is removed from the fluidic spaces 43 through the throughway 22 and/or the orifices 51. The solvent 6 can be applied by placing the die 2 in a tank or by using a spray tool into throughway 22. The orifice layer can be cured at 170 degrees Celsius for about 30 minutes.

Figure 6:
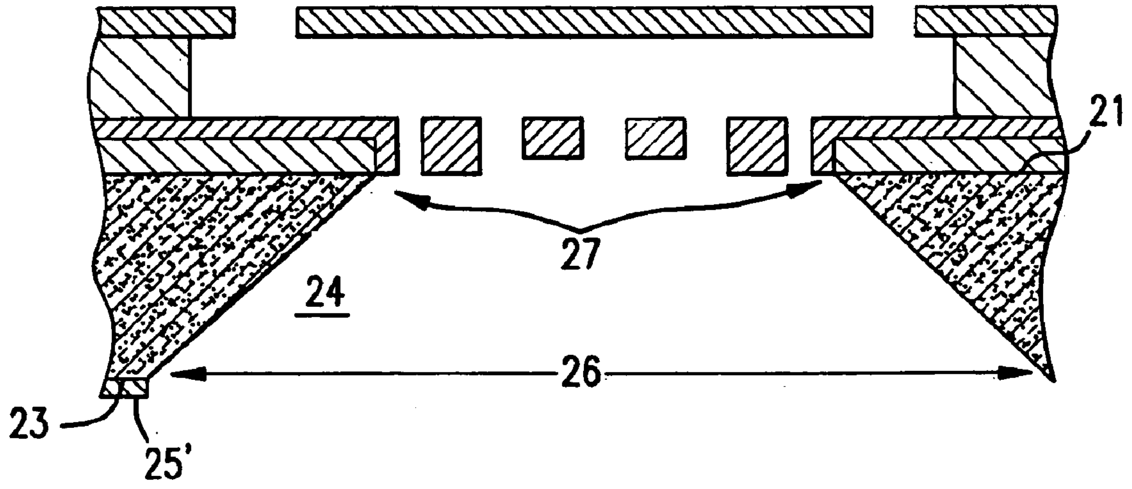
FIG. 6 is a cross-sectional view of an exemplary embodiment of a fluid ejection device with a trench etched in the backside.

FIG. 6 illustrates an exemplary embodiment of the fluid ejection device of FIG. 5 after an additional backside etch has been performed. In an exemplary embodiment, the additional backside etch comprises a wet etch. The wet etch is performed using an etchant, for example, TMAH. In an exemplary embodiment, the wet etch results in an expanded throughway 24 to a width 26 at the backside 23 of the substrate 2 which is wider than the width 26 at the top side 21 of the substrate. In an exemplary embodiment, the expanded throughway 24 is about 130-140 um wide at the topside 21 of the substrate and about 500 um at the backside 23 of the substrate 2. The size of the expanded throughway 2 at the backside of the substrate is defined by a mask 25'.

In an exemplary embodiment, the mask 25' and the wet etch time are arranged and selected to reduce or prevent undercutting the thin film stack 3. The mask 25' comprises, in one exemplary embodiment, a layer of thermally grown oxide on the backside of the substrate is about 1.0 um-1.3 um thick.

In an exemplary embodiment in which SPR220 is used as the filler and in which a TMAH wet backside etch is performed, the wet etch is performed after removing the filler. Otherwise, the SPR220 filler could dissolve in the wet etch bath and contaminate the TMAH, thereby degrading or possibly stopping the wet etch process. In an alternate embodiment, using a filler and corresponding wet etch etchant that do not create cross-contamination problems, the filler could be removed after the wet etch.

Figure 7:
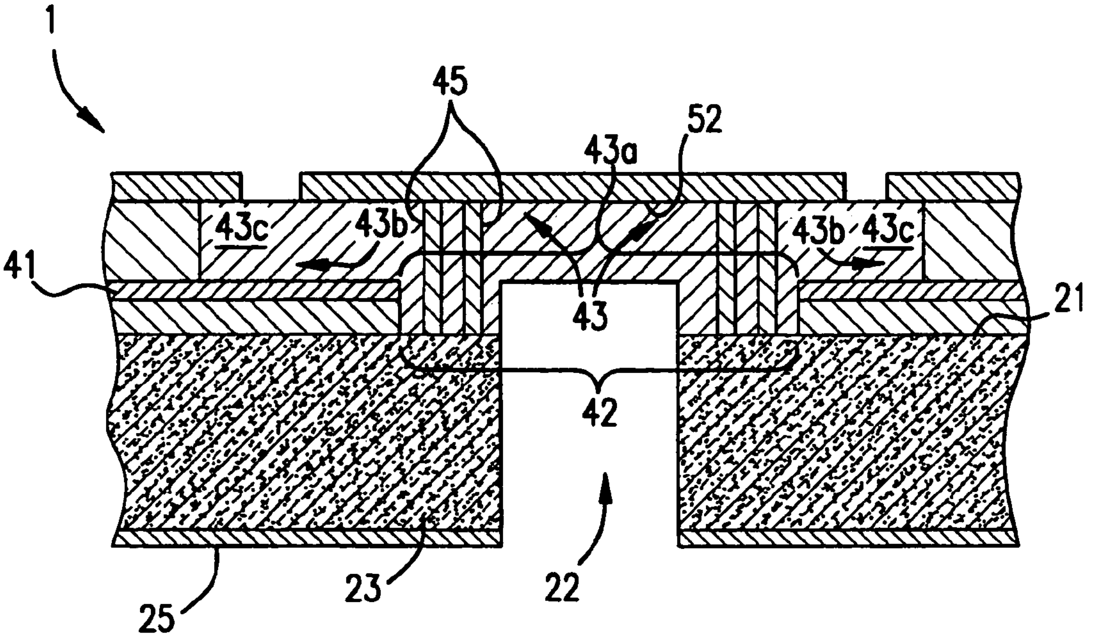
FIG. 7 is a cross-sectional view of an exemplary embodiment of a fluid ejection device with filler in fluidic structures defined in a barrier layer.
Figure 8:
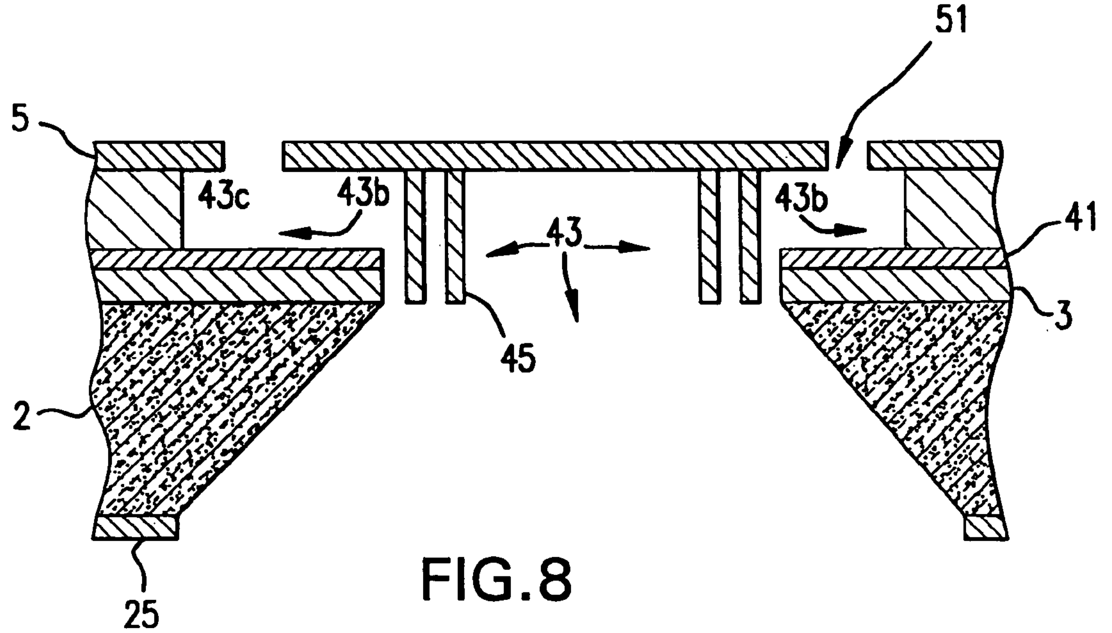
FIG. 8 is a cross-sectional view of an exemplary embodiment of a fluid ejection device with a trench etched in the backside.

FIG. 7 illustrates an exemplary embodiment of an unfinished printhead 1. A throughway 22 has been formed by a dry etch from the backside 23 of the substrate 2. The primer layer 41 does not cover the top surface 21 of the substrate 2 in the area of the fluid fill hole 42. A void 43*a* in the primer layer permits fluid passing through the throughway 22 and the fluid feed hole 42 to pass into the fluidic spaces 43. In an exemplary embodiment, the width of the throughway 22 can be about 80-85 um wide. In the exemplary embodiment of FIG. 7, the barrier layer 4 comprises posts 45. The posts are defined in the barrier layer and the fluidic spaces between the posts 45 are filled with filler. FIG. 8 illustrates the exemplary embodiment of FIG. 7 after the filler has been removed and after a subsequent backside wet etch has been performed. The posts 45 are suspended from the orifice layer 5. In an exemplary embodiment, the posts are sized and spaced to prevent particles in the fluid from passing through the posts and into the fluid channels 43*b* and into the firing chambers 43*c*. In an exemplary embodiment, the width of the expanded throughway 24 at the surface of the substrate after the wet etch is about 130-140 um wide.

Figure 9:
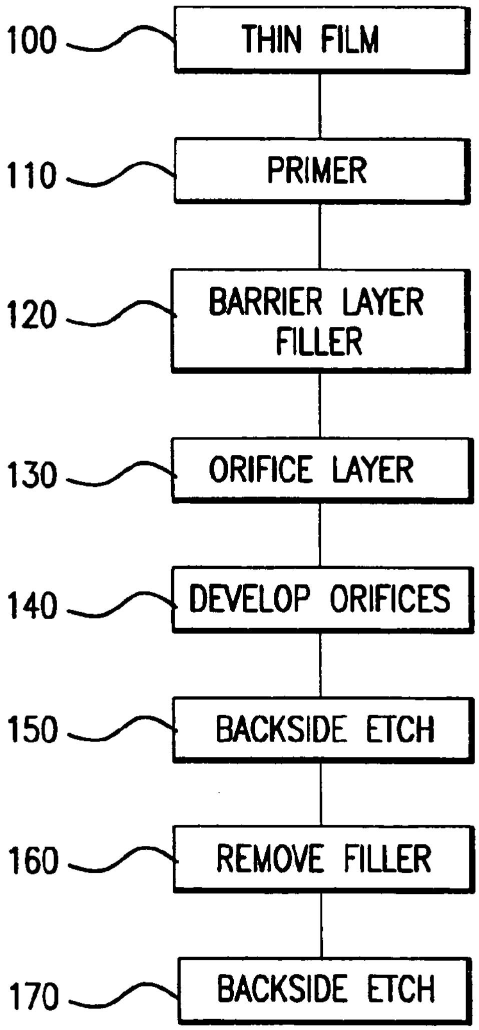
FIG. 9 is a functional block flow diagram of an exemplary process for fabricating a fluid ejection device.

FIG. 9 illustrates a functional block flow diagram of an exemplary embodiment of a process for fabricating a fluid ejection device. A thin film stack is fabricated 100 on a substrate. The thin film stack defines a fluid feed hole. A primer layer with a void in the region of the fluid feed hole is disposed over the substrate and thin film stack 110 and exposed and developed. A barrier layer defining fluidic spaces filled with filler is disposed over the primer layer, the thin film and the substrate 120. An orifice layer with orifices defined in the orifice layer is disposed over or defined over the barrier layer 130. In an exemplary embodiment, the orifice layer is developed with a solvent, leaving voids defining orifices in the orifice layer 140. A backside etch, which in an exemplary embodiment is a dry etch, creates a throughway from the backside of the substrate to the topside of the substrate 150. In an exemplary embodiment, the backside etch comprises a reactive ion etch. The filler is removed with a solvent 160. In an exemplary embodiment, a further backside etch, for example a wet etch using TMAH, expands the throughway in the substrate 170.

Figure 9A:
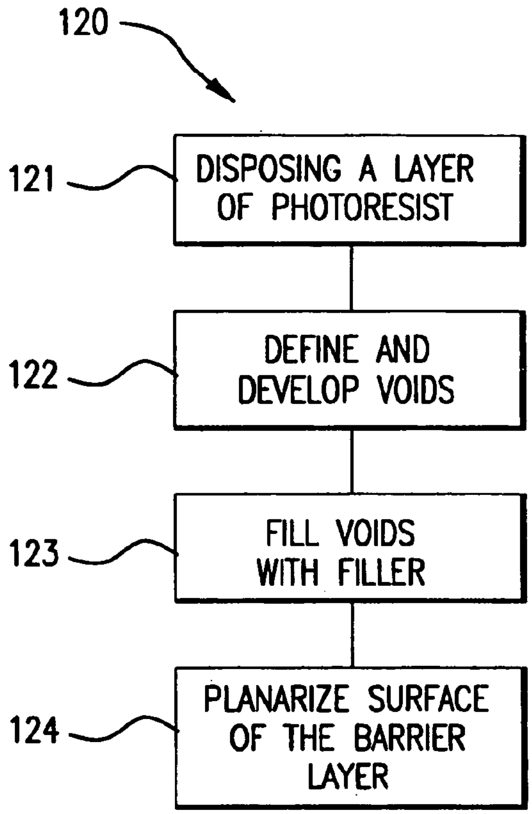
FIGS. 9A-9C are functional block flow diagrams of exemplary processes for fabricating a fluid ejection device.
Figure 9B:
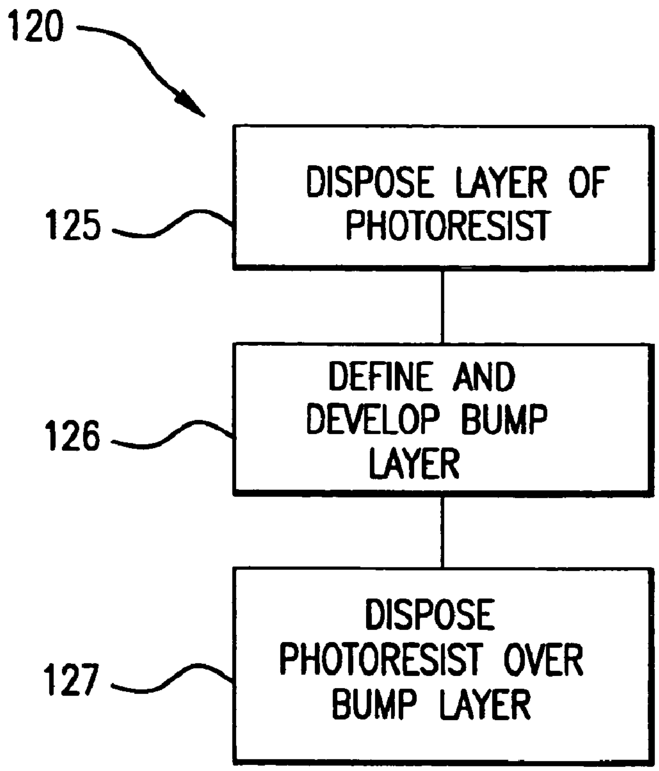

FIG. 9A illustrates a functional flow diagram of an exemplary embodiment of disposing the barrier layer defining fluidic spaces filled with filler 120. A layer of photoresist is disposed at 121 on the substrate over the thin film and primer layer. The layer of photo-resist is selectively exposed and developed to define and create fluidic spaces in the barrier layer at 122. The fluidic spaces are filled with filler at 123 and the barrier layer and filler are planarized at 124. In an alternate embodiment of disposing the barrier layer defining fluidic spaces filled with filler 120, illustrated in FIG. 9B, a layer of photo-resist is disposed at 125. The layer of photo-resist is exposed and developed to define a "bump" layer at 126, the bump layer defining the shapes of the fluidic spaces to be formed. A layer of photo-resist is disposed over and around the bump layer at 127, the layer of photo-resist defining the structural portions of the barrier layer and the orifice layer.

Figure 9C:
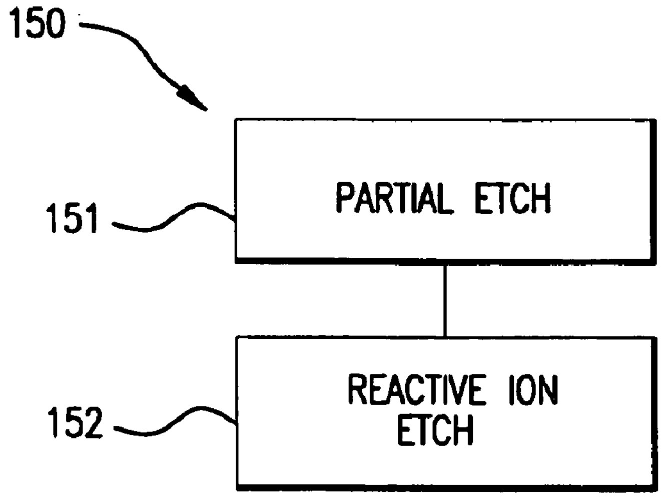

FIG. 9C illustrates an alternate, exemplary embodiment of the backside etch 150 of FIG. 9. In an exemplary embodiment, the throughway through the substrate is partially etched at 151, using a sand drill or laser. The throughway is etched through the remainder of the substrate using a reactive ion etch at 152.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method of fabricating a fluid ejection device, comprising:

providing a barrier layer on a top surface of a substrate, the barrier layer defining fluidic spaces, the fluidic spaces being filled with filler;

forming a throughway from a backside of the substrate;

removing the filler via the throughway from the fluidic spaces.

2. The method of claim 1, wherein said providing the barrier layer comprises providing a layer of photoresist, exposing the layer of photoresist to define the fluidic spaces, developing the layer of photoresist to create voids corresponding to the fluidic spaces and filling the voids with the filler.

3. The method of claim 1, wherein said providing the barrier layer comprises disposing a layer of filler on the substrate, exposing the layer of filler to define the fluidic spaces, developing the layer of filler to leave filler corresponding to the fluidic spaces, and disposing a layer of photo-resist over the filler.

4. The method of claim 1, wherein said forming the throughway comprises performing a dry etch.

5. The method of claim 1, wherein said forming the throughway comprises reactive ion etching.

6. The method of claim 1, comprising first partially etching the throughway by one of either laser etching or sand drill etching, and then reactive ion etching.

7. The method of claim 6, wherein said first partially etching the throughway comprises first partially etching through the substrate to a distance in the range of about 80 to 85 percent of the thickness of the substrate and said reactive ion etching comprises etching through the remaining thickness of the substrate.

8. The method of claim 1, wherein said removing the filler comprises removing the filler using a solvent.

9. The method of claim 8, wherein the solvent comprises ethyl lactate.

10. The method of claim 1, wherein said providing a barrier layer on a top surface of a substrate comprises providing a barrier layer having posts within the fluidic spaces.

11. The method of claim 1, further comprising providing a primer layer between the substrate and the barrier layer.

12. The method of claim 11, wherein said providing a primer layer comprises providing a primer layer with voids through the primer layer.

13. The method of claim 12, wherein the voids have a diameter of less than 10 um.

14. The method of claim 1, wherein said providing the barrier layer comprises providing a layer of photoresist, exposing the layer of photoresist to define the fluidic spaces, developing the layer of photoresist to create voids corresponding to the fluidic spaces, and filling the voids with the filler.

15. The method of claim 1, wherein said providing the barrier layer comprises disposing a layer of filler on the substrate, exposing the layer of filler to define the fluidic spaces, developing the layer of filler to leave filler corresponding to the fluidic spaces, and disposing a layer of photo-resist over the filler.

16. The method of claim 1, further comprising providing at least one orifice in an orifice layer formed on the barrier layer by developing the orifice layer prior to etching the throughway.

17. A method of fabricating a fluid ejection device, comprising:

providing a barrier layer on a top surface of a substrate, the barrier layer defining fluidic spaces, the fluidic spaces being filled with filler, the filler being soluble in a solvent;

providing an orifice layer comprising at least one orifice over the barrier layer;

at least partially forming a throughway from a backside of the substrate;

after forming the throughway, removing the filler through the throughway.

18. The method of claim 17, wherein said providing the barrier layer comprises providing a layer of photoresist, defining and developing voids corresponding to fluidic structures in the layer and filling the voids with filler.

19. The method of claim 17, wherein said providing the barrier layer comprises disposing filler on a substrate and disposing a barrier layer over the filler.

20. The method of claim 17, wherein at least partially forming the throughway comprises reactive ion etching and one of either laser etching or sand drill etching.

21. The method of claim 17, wherein said forming the throughway comprises first partially etching the throughway by one of either laser etching or sand drill etching and then reactive ion etching.

22. The method of claim 21, wherein said first partially etching the throughway comprises etching through the substrate to a distance in the range of about 80 to 85 percent of the thickness of the substrate and said reactive ion etching comprises etching through the remaining thickness of the substrate.

23. The method of claim 17, wherein removing the filler through the throughway comprises providing a solvent into the throughway.

24. The method of claim 17, further comprising developing the orifice layer prior to forming the throughway.

25. The method of claim 24, wherein said developing the orifice layer comprises using a solvent for a period of time sufficient to create the at least one orifice without removing all of the filler from the barrier layer.

26. A method of fabricating a fluid ejection device, comprising:

providing a layer of photoresist on a top surface of a substrate;

selectively exposing the layer of photoresist to define fluidic space portions in the layer of photoresist;

developing the layer of photoresist to remove the fluidic space portions, thereby creating fluidic spaces;

filling the fluidic spaces with filler;

forming a throughway from a backside of the substrate to the top surface of the substrate;

removing the filler from the backside of the substrate through the throughway; and etching the throughway after removing the filler.

27. The method of claim 26, wherein said forming the throughway comprises performing a dry etch.

28. The method of claim 26, wherein said forming the throughway comprises reactive ion etching.

29. The method of claim 26, wherein said forming the throughway comprises one of either laser etching or sand drill etching.

30. The method of claim 26, wherein forming the throughway comprises first partially etching through the substrate to a distance in the range of about 80 to 85 percent of the thickness of the substrate and said etching the throughway comprises etching through the remaining thickness of the substrate.

31. A method of fabricating a fluid ejection device, comprising:

disposing a layer of filler on a top surface of substrate;

exposing the layer of filler to define fluidic space portions;

developing the layer of filler, wherein said developing the layer comprises removing portions of the layer of filler which do not correspond to the fluidic space portions and not removing the fluidic space portions;

providing a layer of photoresist around the fluidic space portions;

providing a fluidic path through the substrate from a backside of the substrate to the top surface of the substrate; and removing the filler from the backside of the substrate through the fluidic path using a solvent.

32. The method of claim 31, wherein said forming the fluidic path comprises performing a dry etch.

33. The method of claim 31, wherein said forming the fluidic path comprises reactive ion etching.

34. The method of claim 31, wherein said forming the fluidic path comprises reactive ion etching and one of either laser etching or sand drill etching.

35. The method of claim 31, wherein providing the fluidic path comprises first partially etching the fluidic path by one of either laser etching or sand drill etching and then reactive ion etching.

36. The method of claim 35, wherein said first partially etching the fluidic path comprises first partially etching through the substrate to a distance in the range of about 80 to 85 percent of the thickness of the substrate and said reactive ion etching comprises etching through the remaining thickness of the substrate.

* * * * *